United States Patent [19]

Sallay

[11] 4,196,177

[45] Apr. 1, 1980

[54] PROCESS FOR PRODUCING BORON COMPOUNDS FROM BORATE ORES

[76] Inventor: Stephen I. Sallay, 2101 Coliseum Blvd. East, Fort Wayne, Ind. 46805

[21] Appl. No.: 927,340

[22] Filed: Jul. 24, 1978

[51] Int. Cl.$^2$ ............................................. C01B 35/10
[52] U.S. Cl. ................................. 423/279; 423/280; 423/283; 260/606.5 B
[58] Field of Search ............... 423/279, 280, 282, 283, 423/284; 23/302 A; 260/606.5 B

[56] References Cited

U.S. PATENT DOCUMENTS

| 1,308,577 | 7/1919 | Calvert et al. | 423/283 |
| 2,102,126 | 12/1937 | Peterson | 423/283 |
| 2,531,182 | 11/1950 | Wiseman | 423/283 |
| 2,833,623 | 5/1958 | May et al. | 423/283 |
| 3,018,163 | 1/1962 | May et al. | 423/282 |

FOREIGN PATENT DOCUMENTS

| 631217 | 4/1963 | Belgium | 423/283 |
| 766912 | 10/1971 | Belgium | 423/283 |
| 624125 | 7/1961 | Canada | 423/283 |
| 354760 | 7/1961 | Switzerland | 423/283 |
| 10361 | of 1897 | United Kingdom | 423/282 |

*Primary Examiner*—G. O. Peters

[57] ABSTRACT

High purity ammonium pentaborate or boric acid is produced from alkali metal and alkaline earth metal borate ores by a relatively non-corrosive technology requiring low energy, without polluting the environment, by treating finely ground borate ores with ammonia and sulphur dioxide or ammonium sulphite in the presence of methanol. Useful by-products, such as sulphites, or fertilizers, such as ammonium phosphates, can be obtained. If the ore is rendered anhydrous prior to treatment, there is produced methylborate-ammonia adduct which upon hydrolysis is transformed into ammonium pentaborate and boric acid.

15 Claims, 5 Drawing Figures

PENTABORATE $B_5O_8^-$-ION

TETRABORATE $B_4O_5(OH)_4^{2-}$-ION

- ⊘ BORON ATOMS
- ⊘ OXYGEN ATOMS, BONDED ONLY TO BORON ATOMS
- ○ OXYGEN ATOMS, ATTACHED TO HYDROGEN AND BORON ATOMS

FERTILIZER ROUTE

RECYCLING ROUTE

PROCESS FOR PRODUCING BORON COMPOUNDS FROM BORATE ORES

BACKGROUND OF THE INVENTION

The present invention relates to the production of highly pure boric acid and ammonium pentaborate from alkali metal and alkaline earth metal borate ores.

There are many minerals containing boron, but relatively few are commercially valuable. Amongst the commercially valuable minerals, there may be mentioned tincal ($Na_2B_4O_7.10H_2O$), kernite or rasorite ($Na_2B_4O_7.4H_2O$), tincalconite ($Na_2B_4O_7.5H_2O$), colemanite or borocalcite ($Ca_2B_6O_{11}.5H_2O$), ulexite or boronatrocalcite ($CaNaB_5O_9.8H_2O$), pandermite or priceite ($5CaO.6B_2O_3.9H_2O$), boracite or stassfurite ($Mg_7Cl_2B_{16}O_{30}$) and the most common refined borates, such as borax pentahydrate ($Na_2B_4O_7.5H_2O$). These are given as illustrative examples of boron-containing minerals which may be employed in the practice of the present invention, but it is to be understood that the invention is in no way intended to be limited thereto. In fact, this invention is quite versatile and is designed to utilize any of the borate ores and refined borates for manufacturing ammonium pentaborate or boric acid. If the borate ore is calcined to render it anhydrous prior to treatment, methylborateammonia addition product is produced which can be further processed into ammonium pentaborate or boric acid.

Demand for boric acid and its derivatives is increased by the rapid growth for a variety of uses in energy saving home products, such as cellulosic fiber-based insulation material (wood fiber), fiberglass insulation (glass wool), textile fiberglass, heat-resistant glass and in fire-resistant cotton batting. Boric acid and its derivatives are consumed chiefly in the glass and ceramic industries and—to a lesser, but important extent—in formulating a variety of products including weed control chemicals, herbicides, fertilizers, antifreezes, soaps, cleaners, cosmetics, drugs, tobacco paper manufacturing, paper adhesives, wood preservatives, etc. In addition, boron compounds are used in combustion improvement of engines, jet fuel stabilization, lubrication, electroplating, nuclear industry, in radiation shielding materials, radioactive surface decontamination, etc.

All prior boric acid manufacturing technology is based upon the water solubility differences between the borate ore, the liberating chemical, the by-product and boric acid. The conventional approach is to chemically liberate boric acid at an elevated temperature while the practically water-insoluble by-product precipitates. The latter is removed from the hot mother-liquor. Then, upon cooling, boric acid crystallizes which is filtered or centrifuged.

The choice of the ore and the reagents will determine the by-product, the waste material, energy requirement, corrosion of manufacturing reactors and pipelines and the ease of separation of gangue and by-products from boric acid.

From a comparative study of over a hundred patents, which have been recorded in the literature since 1906, it was learned that boric acid is usually liberated from its ores in water suspension by (a) acids, (b) acid anhydrides, (c) inorganic salts and (d) by miscellaneous methods. The following references to specific patents in these categories are exemplary and are not intended to be comprehensive.

(a) Most commonly, strong mineral acids, e.g., sulphuric acid (U.S. Pat. No. 837,378, 1906; U.S. Pat. No. 3,650,690, 1972), hydrochloric acid (U.S. Pat. No. 2,855,276, 1958), phosphoric acid (Brit. Pat. No. 423,295, 1934; Ger. Pat. No. 1,133,354, 1960) and anion exchange resin (sulphonic acid) (Hung. Pat. No. 149,522, 1962) are reacted with borate ores.

(b) The reactive mineral acid-anhydrides are also favored reagents for the liberation of boric acid from its ores, including sulphur dioxide (U.S. Pat. No. 1,642,535, 1927; U.S. Pat. No. 2,531,182, 1950), sulphur trioxide (Ital. Pat. No. 689,646, 1965; U.S. Pat. No. 3,454,359, 1969) and carbon dioxide (U.S. Pat. No. 1,108,129, 1914).

(c) Suitable salts which are less corrosive reagents are also successfully applied in boric acid manufacturing technology. Sodium hydrosulphite (Belg. Pat. No. 631,217, 1963), sodium hydrosulphate (Japan Pat. No. 6825,145, 1968), ammonium sulphate (U.S. Pat. No. 3,103,412, 1963), ammonium hydrocarbonate (Ital. Pat. No. 619,003, 1961) and ammonium carbonate (Swiss Pat. No. 354,760, 1961; Belg. Pat. No. 766,912, 1971) were patented as useful reagents for manufacturing boric acid from a variety of borate ores.

(d) Finally, the electrochemical process (Brit. Pat. No. 1,030,969, 1964) is a good example of less frequently used technologies.

As was pointed out above, when the starting boron-containing product is anhydrous in nature, the process according to the present invention to be described hereinafter produces a methyl borate-ammonia adduct. A quantitative esterification of boric acid to methyl borate in the presence of sulphuric acid has been earlier demonstrated by H. I. Schlesinger, H. C. Brown, D. L. Mayfield and J. R. Gilbreath, J. Am. Chem. Soc. 75, 213–215 (1953). Addition compounds between methylborate, ammonia and amines have been described by Goubeau et al., (Z. anorg. u. allgem. Chem., 266, 27–37, 1951; ibid., 266 161–174, 1951). H. A. Lehmann and W. Schmidt (Z. Chem. 5, 65–6 and 111, 1965) have described ammonium pentaborate formation from boric acid and ammonia in polar solvents. But, the methylborate-ammonia adduct has not been prepared directly from alkali metal borates, such as tincal (borax) or alkaline earth metal borate ores, such as colemanite.

As is also mentioned above, the commercially important ammonium pentaborate can be produced in accordance with the present invention. Ammonium pentaborate was previously manufactured exclusively from the less abundantly occurring alkaline earth pentaborates, such as colemanite, Gerstley borate (e.g. U.S. Pat. No. 3,103,412, 1963; Swiss Pat. No. 354,760, 1961; Belg. Pat. No. 631,217, 1963; Ital. Pat. No. 794,945, 1967) and potassium pentaborate (e.g. U.S. Pat. No. 2,948,592, 1960). Transformation of borax to ammonium pentaborate in dilute (10%) aqueous ammonium chloride solution at 100° C. was earlier reported (U.S. Pat. No. 2,867,502, 1959; Ch. O. Wilson et al., Advances in Chem. Ser. No. 32, 20–26, 1961). In these processes, the separation of sodium chloride and ammonium pentaborate was cumbersome. Most importantly, the distillation of a large volume of water from the pentaborate required high energy. As will subsequently be described, the process according to the present invention, which uses different reagents and solvent, requires significantly lower energy.

The present invention involves the discovery that ammonium sulphite in methanol rearranges tetraborate ores into ammonium pentaborate and opens the way for manufacturing this valuable fire retardant from the most ubiquitous, least expensive borate ores, such as tincal (borax), kernite, ulexite and the like. The crystal structure of borax is transformed into that of the more stable ammonium pentaborate. In order to understand the chemistry of this structural change, one should refer to the publications of C. L. Christ et al. (Acta Cryst., 9, 830, 1956; ibid. 10, 776, 1957; 11, 761, 1958; 12, 162, 1959) and J. Krogh-Moe (Arkiv Kemi, 14, 439, 1959). These authors have shown that the familiar chemical formula of borax ($Na_2B_4O_7.10H_2O$) needs to be revised. Their X-ray crystallographic studies revealed that borax is composed of crystal units consisting of two planar $BO_3$ groups and two tetrahedral $BO_4^-$-ions and that the crystal lattice of borax corresponds to $Na_2[B_4O_5(OH)_4.8H_2O]$. The crystal matrix of borax consists of infinite cation-water complexes $[Na(H_2O)_4]_n{}^{n-1}$, formed from octahedral $Na(H_2O)_6$ groups, sharing edges of complex ions $B_4O_5(OH)_4{}^{2-}$ as is illustrated by FIG. 1 of the drawings.

Furthermore, three dimensional framework ions occur in the pentaborate structures. The complex ion arises by joining rings into helices and the crystal is built by two identical interpenetrating framework $B_5O_8{}^-$-ions, as is illustrated by FIG. 2 of the drawings. These ions consist of four planar $BO_3$ groups and one tetrahedral $BO_4{}^-$-ion. The facile transformation of tetraborate ores to ammonium pentaborate structure in accordance with the present invention changes the planar $BO_3$ group and tetrahedral $BO_4{}^-$-ion ratio from 1:1 to 4:1. This tendency toward stabilization seems to be a major driving force of the chemical transformation which takes place in the practice of the present invention, which will be described in detail hereinafter.

BRIEF SUMMARY OF THE INVENTION

The primary objective of this invention is to provide a new and economical process for manufacturing methylborate-ammonia adduct, ammonium pentaborate or boric acid from the more abundantly available borate ores.

The most important discovery involved in the invention is that in accordance with its practice, transformation of the tetraborate-ion $[B_4O_5(OH)_4.8H_2O]^{2-}$ into the pentaborate-ion $[B_5O_8.4H_2O]^-$ is effected.

One of the advantages of the invention is that it allows for easy removal of inorganic by-product and gangue from the desired borate products.

Another characteristic of the process of the invention is its relatively low-energy requirement.

A further advantage of the invention is that it creates no waste problem with its attendant capability of polluting the environment, and the process leads to useful by-products.

An additional feature of the process of the invention is that it has a low level of corrosiveness.

The above objectives and advantages are realized by contacting a finely ground alkali metal or alkaline earth metal borate ore with ammonium sulphite in a body of methanol which serves the dual function of acting as solvent and reactant. There will be produced trimethylborate-ammonia adduct, ammonium pentaborate, boric acid and mixtures thereof in accordance with the amount of water present which may derive either from the bound water originally present in the ore or added as free water. This is caused by the fact that hydrolysis proceeds from the adduct to the pentaborate and finally to boric acid.

Thus, it will be apparent that if the ore is calcined (anhydrous) prior to treatment, the adduct will be formed exclusively, but it can readily be converted to boric acid by a subsequent hydrolysis. On the other hand, if a product which is predominantly ammonium pentaborate which is of value as a fire-retardant is desired, the amount of water present will be tailored to achieve this result.

The process according to the invention is adapted to being carried out in two routes, one being designated the "recycling route" by which boric acid can be liberated from ammonium borates by sulphur dioxide with a complete recovery of ammonia and methanol being achieved, and the other a "fertilizer route" by which ammonium borates are converted to boric acid by reaction with a mineral acid or anhydride other than sulphur dioxide yielding ammonium salts useful as fertilizers while returning at least theoretically, 60% of ammonia and substantially all of the methanol to the process.

DETAILED DESCRIPTION OF THE INVENTION

Figure 2:
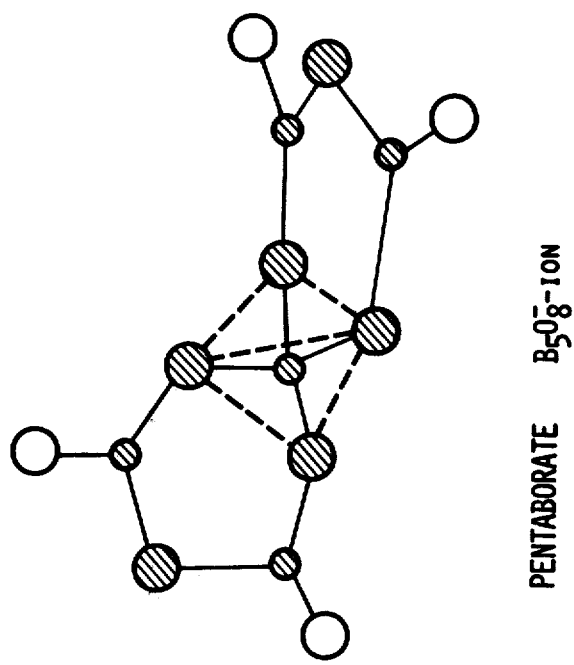
FIG. 2, also mentioned earlier, is a depiction of the crystal lattice of the pentaborate structures.

The invention will now be described in detail with reference to the drawings.

The present invention relates to the recovery of boron values from its ores. It is concerned with the shortage of inexpensive energy, and is designed to maximize the usefulness of by-products and prevent any adverse impact upon the environment. This new technology is applicable to all borate ores, and as representative, there may be mentioned kernite, tincalconite and the mixed salt ulexite. Conventional technologies produce water-soluble sodium salt as a by-product from these ores, e.g., sodium sulphate, sodium sulphite, sodium carbonate, etc. These by-products can only be recovered from their water solution by high-energy requiring evaporation. Alternatively, their disposal causes serious environmental problems.

This invention uses methyl alcohol (wood alcohol) as solvent and ammonium sulphite as a reagent to liberate boron from its ores in the form of products highly valuable in themselves. The comparatively low boiling methyl alcohol (b.p. 64° C.) makes possible its relatively easy regeneration by distillation. Most importantly, the water-soluble Na-salt or other inorganic salt by-product is practically insoluble in methanol and, after the leaching of ore is completed, they can be easily filtered from the methanolic solution.

A most important finding of this invention is that the commonly occurring tetraborate ores, such as tincal (borax), etc., are readily rearranged with ammonium sulphite in methanol into the valuable fire-retardant, ammonium pentaborate. If desired, the latter can be hydrolyzed by a suitable acid to boric acid.

The reaction taking place during the leaching of tincal in the presence of ammonium sulphite in methanolic suspension may be represented by Equation 1.

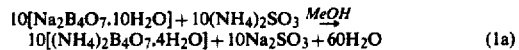

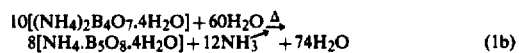

The driving force of this displacement reaction is the solubility difference between the products, ammonium borates and sodium sulphite, in methanol, the first being very soluble and the latter insoluble in the hot alcohol. Another driving force seems to be the formation of the more stable pentaborate structure which is accompanied by the loss of ammonia and water. Indeed, during the reaction copious ammonia gas evolution is observed.

Support for the mechanism shown by Equation 1 is provided by the instant ammonia release when equimolar mixture of ammonium sulphite and borax in methanol is stirred at room temperature. This finding suggests that the intermediate ammonium tetraborate is readily transformed during the treatment of tincal or other tetraborate ores with ammonium sulphite into ammonium pentaborate, ammonia and water (eq. 1b).

According to Equation 1, only 26% of the bound water content of tincal is utilized during the described reaction and 74% of the water remains unused. As will later be explained, this water is useful for hydrolyzing an intermediate methylborate-ammonia adduct, which is believed to be formed as a transitory intermediate.

Support for this mechanism was found when anhydrous borax was refluxed in methanol with equimolar ammonium sulphite. Here not only ammonia gas was liberated, but also a colorless solid sublimed from the reaction mixture which eventually clogged the reflux condenser. Filtration of the hot methanolic slurry yielded the expected sodium sulphite in quantitative yield. Furthermore, upon evaporation of the methanol filtrate, ammonium pentaborate was also obtained. The solid which sublimed into the condenser was identified as the trimethylborate-ammonia adduct. Its formation is explained by Equation 2.

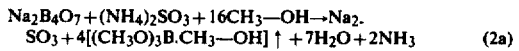

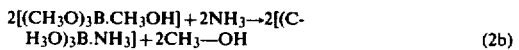

First, ammonium sulphite reacts with anhydrous borax in the presence of methanol, leading to methylborate-methanol azeotropic mixture, ammonia, water and sodium sulphite (Eq. 2a). Then, methylborate and ammonia form an adduct and sublime as methylborate-ammonia addition complex (Eq. 2b).

An authentic sample of methylborate-ammonia adduct made from ammonia and methylborate in methanol and the sublime in Equation 2b exhibited identical IR and NMR spectra. IR: $\lambda_{max}^{nujol}$ 2900, 2840, 2210, 1970, 1450, 1370, 1340, 1200, 1050, 960 and 920 cm$^{-1}$; NMR: $\delta$ 3.50 ppm (s, OCH$_3$), $\delta$1.45 ppm (b, NH$_3$) in CDCl$_3$ (TMS internal standard). The two chemical shifts of freshly prepared samples showed a proton ratio of 3:1 which is in agreement with formula (CH$_3$O)$_3$B.NH$_3$.

Another important finding of this invention is that the methylborate-ammonia adduct can be transformed into ammonium pentaborate in the presence of water. The reaction can be explained in Equation 3.

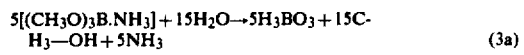

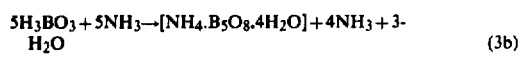

It is evident that the methylborate-ammonia addition product is instantly hydrolyzed by water to boric acid (Eq. 3a) which in the presence of the excess amount of ammonia stabilizes in ammonium pentaborate. Its structural assignment was verified by infrared spectroscopy and elemental analysis.

Further experiments indicated that reactions described in Equations 1→3 must correlate with each other in methanol. As described above, anhydrous borax yields ammonium pentaborate and methylborate-ammonia addition product. In case of tincal (borax.-10H$_2$O), its crystal water spontaneously hydrolyzes most of the methylborate. But the methanolic distillate of the reaction mixture still contains some methylborate. This borate ester in the presence of the excess ammonia provides additional ammonium pentaborate upon treatment with water. In summary, methanol plays a more important role than merely being a solvent. Indeed, methanol participates in the chemical reaction as a reagent as well.

The transformation of methylborate-ammonia adduct to ammonium pentaborate is another cardinal feature of this invention.

The discovery that ammonium sulphite in methanol rearranges tetraborate ores into ammonium pentaborate (Eq. 1→3) opens the way for manufacturing this valuable fire retardant from the most ubiquitous, least expensive borate ores, such as tincal (borax), kernite, ulexite and the like.

Figure 1:
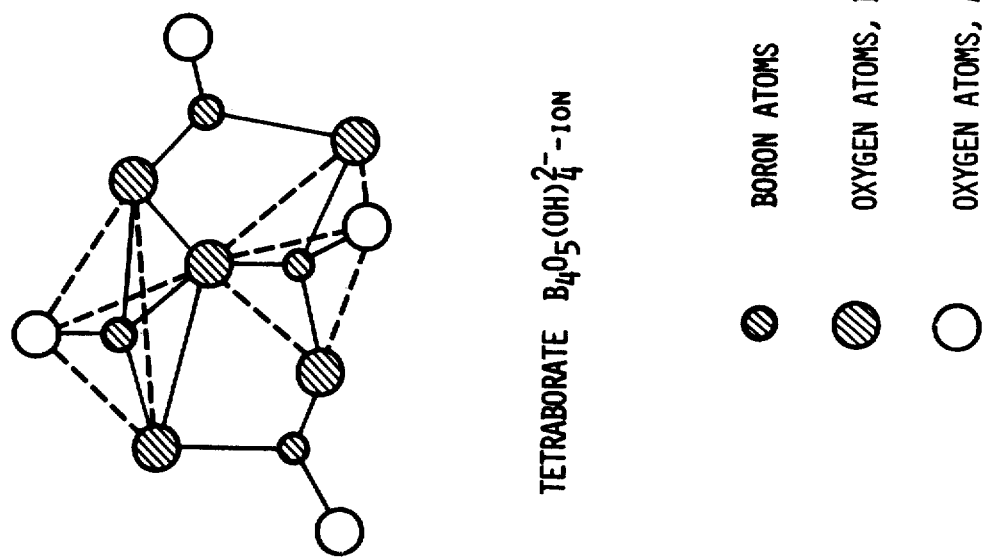
FIG. 1, mentioned earlier, is a depiction of the crystal lattice of the tetraborate structures.

Under the novel reaction conditions presented in this invention, the crystal structure of borax is transformed into the more stable ammonium pentaborate, the respective structures being shown in FIGS. 1 and 2 of the drawings. These representations show that the familiar chemical formula of borax (Na$_2$B$_4$O$_7$.10H$_2$O) needs elucidation. It is revealed that borax is composed of crystal units consisting of two planar BO$_3$ groups and two tetrahedral BO$_4^-$-ions and that the crystal lattice of borax corresponds to Na$_2$[B$_4$O$_5$(OH)$_4$.8H$_2$O]. The crystal matrix of borax consists of infinite cation-water complexes [Na(H$_2$O)$_4$]$_n^{n-1}$, formed from octahedral Na(H$_2$O)$_6$ groups, sharing edges of complex ions B$_4$O$_5$.(OH)$_4^{2-}$ (FIG. 1).

On the other hand, three dimensional framework ions occur in the pentaborate structures. The complex ion arises by joining rings into helices and the crystal is built by two identical interpenetrating framework B$_5$O$_8^-$-ions (FIG. 2). These ions consist of four planar BO$_3$ groups and one tetrahedral BO$_4^-$-ion. The facile transformation of tetraborate ores to ammonium pentaborate structure, under the conditions described herein, changes the planar BO$_3$ group and tetrahedral BO$_4^-$-ion ratio from 1:1 to 4:1. This tendency toward stabilization seems to be a major driving force of the chemical transformation expressed in Equation 1.

After the chemical reactions of Equations 1→3 are completed, the methanol insoluble by-product, sodium sulphite (or other alkali metal, alkaline earth metal sulphite, along with the gangue present, is filtered. The mother-liquor is concentrated by atmospheric pressure distillation. The methylborate and some ammonia is removed by this process. The former is recycled and it will be transformed into the pentaborate during the next cycle as described in Equation 3.

After the distillation of methanol, ammonium borates remain dissolved in the hot water which derives partly from the crystal water of borax and partly as a by-product of the reactions described by Equations 1→3. Upon cooling the hot water solution, nicely formed ammonium borate crystals are obtained. After recrystallization from water, pure ammonium pentaborate is produced. Its IR spectrum is superimposable with the spectrum of the authentic specimen. $\lambda_{max}^{kBr}$ 3350 (b), 1630 (s), 1420 (v.s.), 1330 (v.s.), 1230 (m), 1078 (m), 1003 (m), 905 (s), 770 (s), 680 (s) cm$^{-1}$. The ammonia and boric acid analysis of the pure sample is in agreement with the theoretical values.

As an alternative route, the concentrated hot solution of ammonium borates can be treated with a suitable mineral acid, such as sulphurous acid or phosphoric acid. These acids liberate boric acid according to Equation 4.

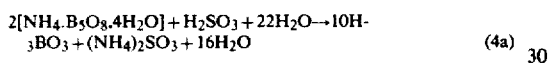

$$2[NH_4.B_5O_8.4H_2O] + H_2SO_3 + 22H_2O \rightarrow 10H_3BO_3 + (NH_4)_2SO_3 + 16H_2O \quad (4a)$$

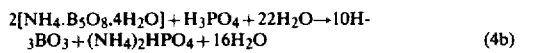

$$2[NH_4.B_5O_8.4H_2O] + H_3PO_4 + 22H_2O \rightarrow 10H_3BO_3 + (NH_4)_2HPO_4 + 16H_2O \quad (4b)$$

After the reaction mixture is cooled, high quality, crystalline boric acid is obtained which can readily be separated, as by filtration or centrifugation. The mother-liquor contains useful ammonium salt, ammonium sulphite or ammonium phosphates. The first can be recycled in the process and the latter produces valuable fertilizers. Naturally, other mineral acids, such as hydrochloric acid, sulphuric acid, nitric acid, etc., can be also be used for the liberation of boric acid.

Figure 3:
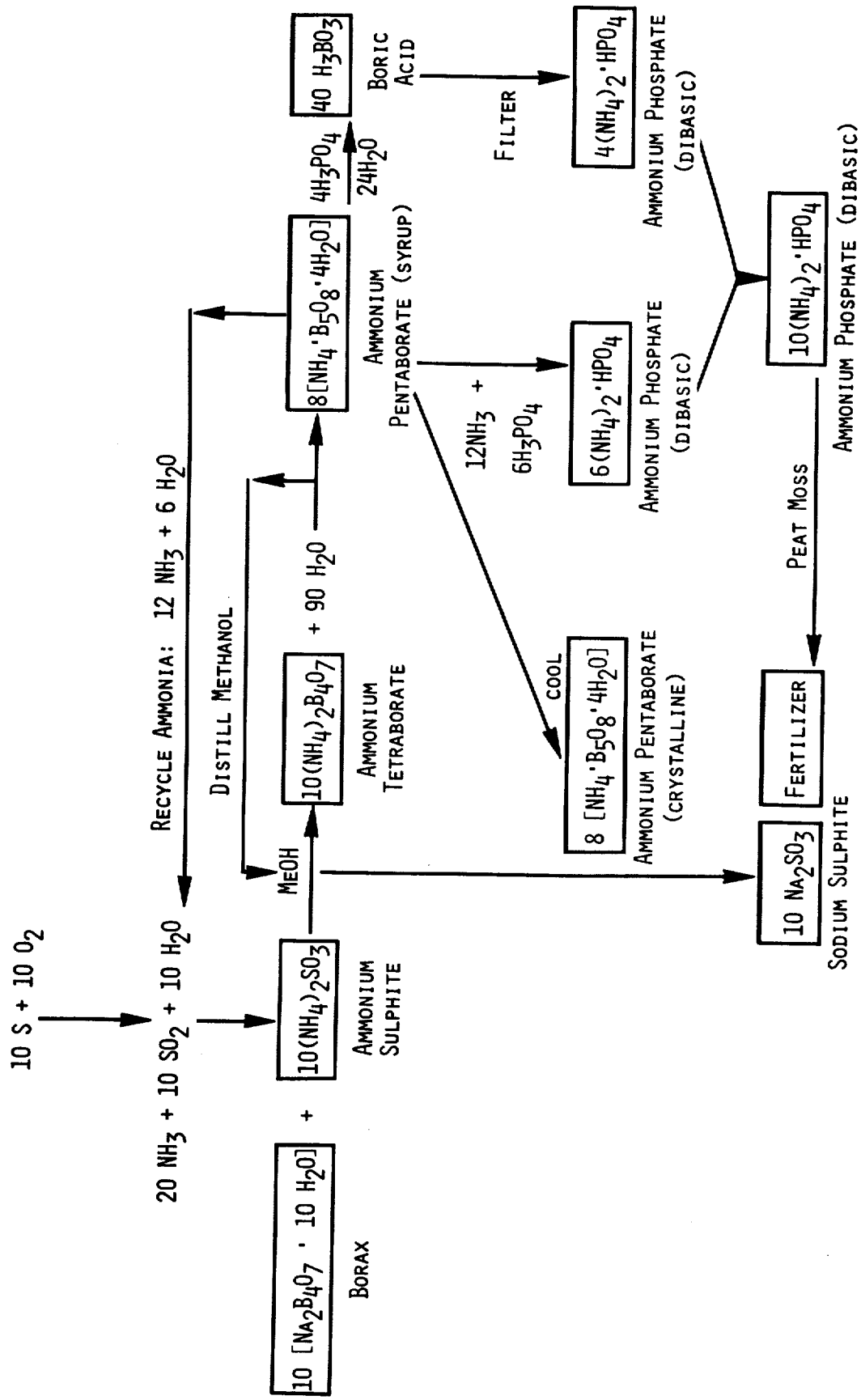
FIG. 3 is a flow sheet illustrating the so-called "fertilizer route" embodiment of the invention.
Figure 4:
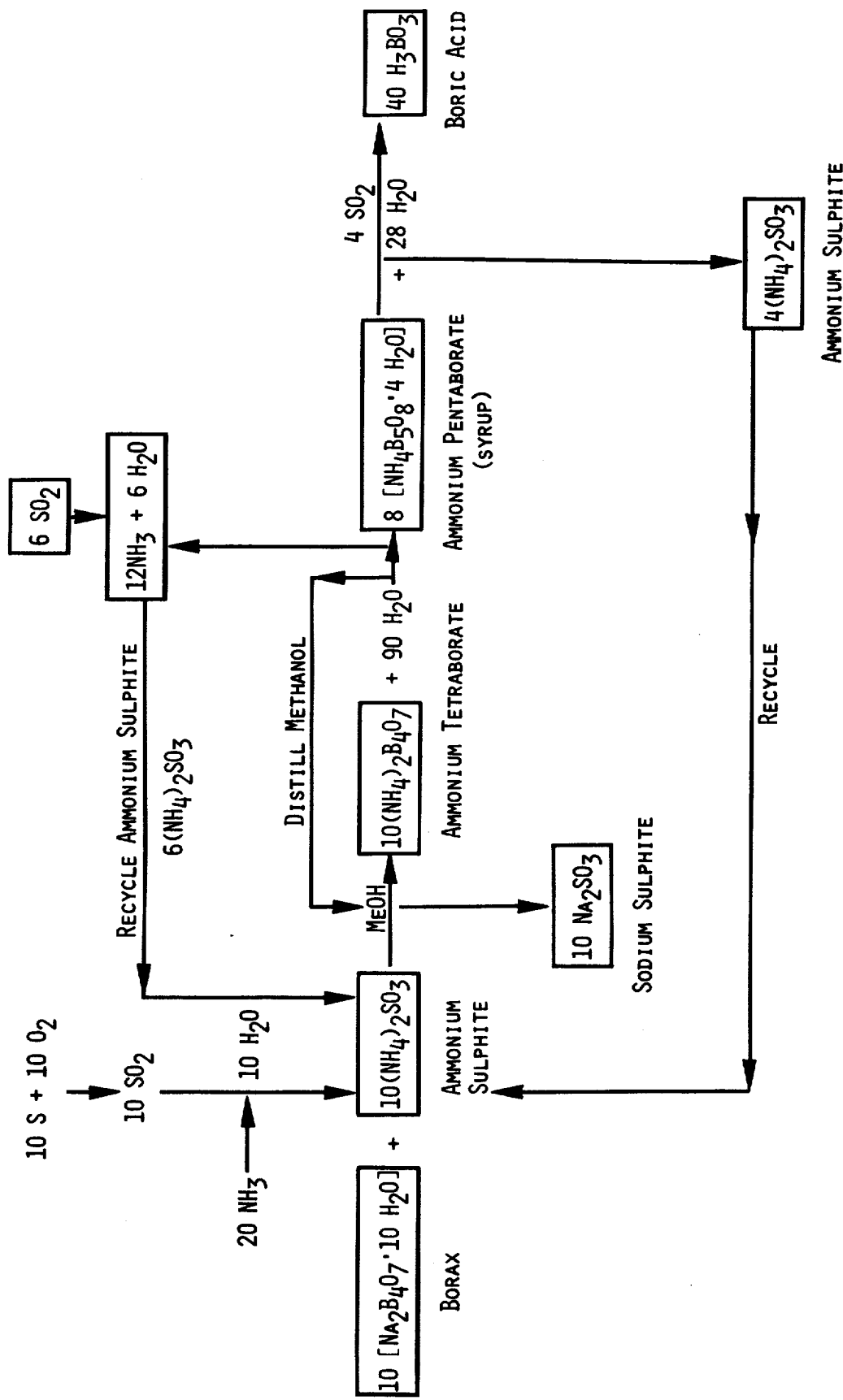
FIG. 4 is a flow sheet illustrating the so-called "recycling route" embodiment of the invention.

The above described alternatives, the first designated the "fertilizer route" is illustrated by the flow sheet of FIG. 3, and the second designated the "recycling route" is illustrated by the flow sheet of FIG. 4.

Figure 5:
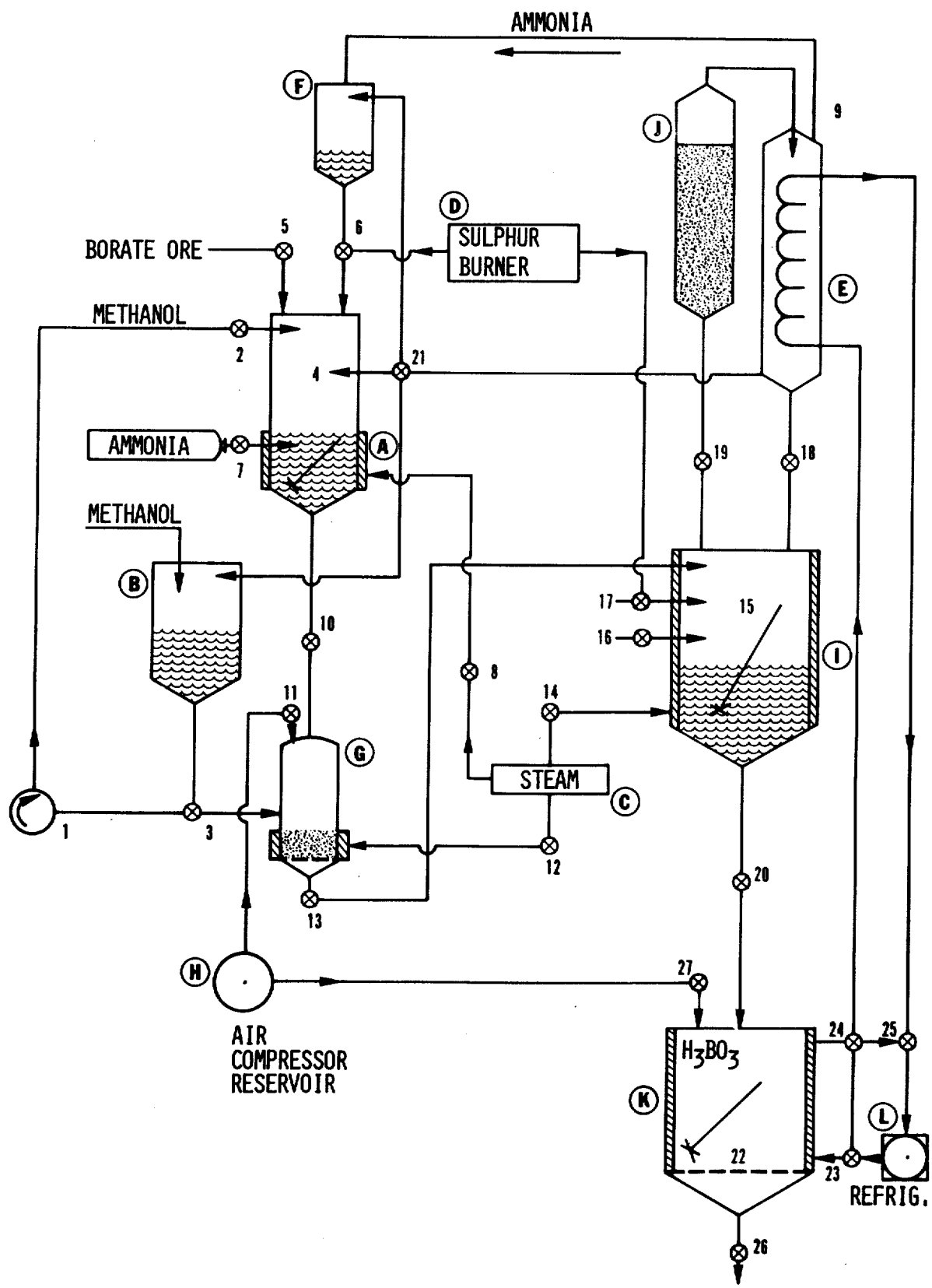
FIG. 5 is a diagrammatic showing of apparatus designed for carrying out both of the embodiments of the invention illustrated by the flow sheets of FIGS. 3 and 4.

Both of the described embodiments of the process according to the invention may be carried out in apparatus diagramatically shown in FIG. 5.

Reactor A is charged with methanol from reservoir B using pump 1, through valves 2 and 3. Into the mechanically stirred body of methanol 4, finely ground borate ore (~100–200 mesh) is fed through line and valve 5 to form a slurry. The ore will often contain sufficient water in the form of water of crystallization, but if it does not have adequate water, a calculated amount of water is added to the reaction mixture. Then ammonium sulphite is added through pipe 6. The ammonium sulphite may have been previously prepared or, alternatively, sulphur dioxide generated in a sulphur burner and ammonia gas can be fed into the stirred methanolic slurry of borate ore through valves 6 and 7, respectively to effect formation of ammonium sulphite in situ.

There should be sufficient methanol present to dissolve all of the desired boron-containing product formed, and this can readily be determined by experimentation, and it is to be pointed out that the order of addition of the various reactants is not critical. It is preferred, however, that, when ammonium sulphite is to be formed in situ, the sulphur dioxide and ammonia be introduced simultaneously into the slurry of finely ground ore and methanol. The amount of the ammonium sulphite reactant required will be apparent from the foregoing equations. It is well to have a slight excess which obviously can be recycled and will not be lost.

An exothermic reaction takes place and the reaction mixture is stirred for 20–60 minutes. If additional heat is needed, the reaction mixture can be refluxed by steam C through pipe and valve 8; or heat from the burning sulphur D can be utilized to heat the solution. Condenser E refluxes methanol while the evolving ammonia gas escapes through pipe 9. Ammonia is trapped by sulphur dioxide in methanol or phosphoric acid in water solution in reservoir F. When ammonium sulphite is formed, it can be recycled into reactor A through line 6. After most of the ammonia evolves, dissolved ammonium borates are present in the methanol, and the insoluble metal sulphites and gangue are ready for filtration. Sodium and calcium sulphites will predominate, but, depending upon the raw ore's chemical composition, magnesium and potassium sulphites, for example are also formed. All these salts, as well as the gangue, are practically insoluble in methanol.

Then the warm suspension is released through valved line 10 into the steam-jacketed pressure filter G. After closing the valve in line 10, air under pressure is introduced using an air compressor H through line 11, and the suspension is filtered. The filtrate is collected in the reactor vessel I, passing through line and valve 13. From the solvent reservoir B through a pipe line and three-way valve 3, fresh methanol is used for rinsing the filter cake before it is removed from the filter. The last traces of methanol are removed from the moist filter cake by heating the filter G by steam introduced through line and valve 12, the process being facilitated by compressed air introduced through the line 11. Thus, the solvent is completely transferred into reactor I through valve 13.

Reactor I is heated by steam C passing through valved line 14. This reactor has a mechanical stirrer 15, an inlet 16 for water, and inlet 17 for sulphur dioxide or a mineral acid, such as phosphoric acid, a valved line 18 leading to condenser E, a valved line 19 leading to the fractionation column J and a valved release line 20 leading to the crystallization vessel K.

The contents of I are brought to a boiling point (64°–70° C.) by steam passing through line 14 and distilled into fractionating column J through valved line 19. Methanol is condensed in E, and recycled through pipe and three-way valve 21 to the reservoir B or F. The fractionation column J is filled by ¼" stainless-steel helices and possesses at least 15 theoretical plate separation capacity. The distillation residue is composed of ammonium borates and some water.

If the borate salt crystallizes, it can be dissolved in a minimum amount of water introduced through line 16 while the heated, stirred solution is reacted with an acid, preferably phosphoric or sulphurous acid, introduced through line 17.

The hot aqueous solution of boric acid and ammonium phosphate or ammonium sulphite is now released through valve 20 into a jacketed crystallization vessel K. The crystallization of boric acid can be facilitated by agitation by means of a stirrer 22 and cooling with chilled brine passing through valves 23, 24 and 25. After crystallization, the boric acid is removed by filtration from its mother-liquor, with the help of compressed air introduced through a valved line 27. The mother-liquor is removed through a valved line 26.

In the carrying out of the invention in accordance with the recycling route illustrated by FIG. 4, sulphur dioxide will have been introduced into reactor I through inlet 17 and the mother-liquor will have ammonium sulphite dissolved therein, which after being freed of water in a drier is recycled into the process.

In the practice of the invention in accordance with the fertilizer route illustrated by FIG. 3, a mineral acid, preferably phosphoric acid, will have been introduced into reactor I through inlet 17 and the mother-liquor will comprise an aqueous solution of the ammonium salt of the mineral acid. The solution can be taken up by a suitable porous material, such as peat moss, vermiculite, cellulose-based waste material and the like, providing valuable fertilizer.

The following examples are given as illustrating the present invention, but are not to be considered as limiting the same.

EXAMPLE 1

Into a mechanically stirred reaction vessel which contained a suspension of 381.42 g (1 mole) borax ($Na_2B_4O_7.10H_2O$) in 1.0 l methanol, 34 g (2 moles) ammonium gas and 64 g (1 mole) sulphur dioxide gas were introduced. During an exothermic reaction, ammonia gas evolved which was absorbed in methanol. In a separate experiment, the formation of 1.1 mole ammonia was determined. This corresponds to 91% of the theoretically expected 1.2 mole ammonia (Eq. 1b).

After the reaction mixture was stirred at reflux temperature for about 20 minutes, the chemical transformation of borax to ammonium borate was completed. The reaction mixture was then filtered through a pressure filter and sodium sulphite (124 g=98.5%) was isolated. The methanol was fractionated from water through a column, and a mixture of ammonium tetraborate and pentaborate precipitated as a white solid (180.7 g=83%).

A sample of the crude product recrystallized from water yielded large, stout prisms which were identified by thermometric analysis as pure ammonium-pentaborate. Its IR spectrum ($\lambda_{max}^{kBr}$ 3350 (b), 1630 (w), 1420 (v.s.), 1330 (v.s.), 1230 (m), 1078 (m), 1003 (m), 905 (s), 770 (s), 680 (s) cm$^{-1}$ was identical with the spectrum of an authentic specimen.

The methanolic distillate contained the rest of the boron value in the form of methylborate which was decomposed by water to obtain boric acid.

EXAMPLE 2

($Na_2B_4O_7.10H_2O$)

Borax (19.05 g=0.05 mole)/and ammonium sulphite (6.09 g=0.0525 mole) were stirred and refluxed in 100 ml methanol for about 20 minutes while vigorous ammonia gas evolution occurred. From the hot reaction mixture, sodium sulphite (6.0 g=95.2%) was pressure filtered. The warm filtrate was distilled at atmospheric pressure using a 30×2 cm fractionation column, filled with glass helices. The distillation residue comprised a mixture of ammonium tetraborate and pentaborate in water. Upon cooling 10.88 g white solid separated. Thermometric titration of the crude product showed a boron content equivalent to 95.8% boric acid. The titration also showed that the crude product was a mixture of 92.7% ammonium pentaborate and 7.3% ammonium tetraborate.

The distilled methanol contained methylborate which was decomposed by 8 ml of water. After evaporation of solvents, 0.48 g of boric acid was isolated.

EXAMPLE 3

Study of reaction rate between borax and ammonium sulphite in methanol

Borax $Na_2B_4O_7.10H_2O$ (7.62 g=0.02 mole) and ammonium sulphite (2.32 g=0.02 mole) were stirred in 40 ml methanol at room temperature. Samples of the stirred slurry were taken out after certain time intervals. The samples were filtered on a small Buchner funnel and washed once with methanol. Then the dried filter cake was analyzed for boric acid content. It was found that the initial 64.82% boric acid content of borax rapidly declined, as is shown in the following table:

TABLE

| Time of reaction (hours) | Boric acid content (%) |
| --- | --- |
| 0 | 64.82 |
| 0.5 | 17.0 |
| 2.5 | 11.6 |
| 4.0 | 6.0 |
| 5.5 | 4.2 |
| 26.5 | 28.7 |

The room temperature reaction-rate study clearly shows the rapid transformation of borax to ammonium tetraborate which, due to its excellent solubility in methanol, was removed by filtration. The increased value of boric acid content after 26.5 hours shows that ammonium tetraborate was slowly transformed into the crystalline ammonium pentaborate which has a lower solubility than ammonium tetraborate in methanol.

EXAMPLE 4

Preparation of ammonium pentaborate from borate ores

Following the procedure of Example 1, but substituting the borax with a equimolar amount of finely ground borate ore, tincal, ammonium borates and methylborate were obtained as major products in comparable yields.

EXAMPLE 5

A mixture of anhydrous borax (20.1 g=0.1 mole) and ammonium sulphite (11.6 g=0.1 mole) was stirred in 100 ml methanol with reflux. Strong ammonia evolution took place while 10.0 g of methylborate-ammonia adduct sublimed into the reflux condenser (Eq. 2a, 2b). The IR spectrum of a fresh sample of the adduct exhibited $\lambda_{max}^{nujol}$ 2900 (v.s.), 2840 (v.s.), 2210 (w), 1450 (s), 1370 (m), 1340 (m), 1200 (m), 1050 (s), 960 (s) and 920 (s) cm$^{-1}$; NMR: δ 3.50 ppm (s, $OCH_3$), δ 1.45 ppm (b, $NH_3$) in $CDCl_3$ (TMS internal standard). The chemical shifts showed a proton ratio of 3:1 in agreement with formula $(CH_3O)_3B.NH_3$.

EXAMPLE 6

In a reaction vessel which was equipped with a mechanical stirrer, a reflux condenser and dropping funnel, 250 ml of authentic methylborate in methanol (54.6% w/v) was treated with 130 ml 15% (w/v) dry ammonia gas dissolved in methanol. An exothermic reaction took place and by gentle refluxing for about 1 hour methylborate-ammonia addition complex sublimed into the reflux condenser. Its IR and NMR spectra were identical with the spectrum described in Example 5, thus confirming the results obtained in this latter example.

EXAMPLE 7

The methylborate-ammonia adduct (10.0 g), prepared in Example 5 was dissolved in 10 ml water and evaporated to dryness. The residue was indentified as ammonium pentaborate. A sample of the crude product was recrystallized from water yielding large, glassy crystals. IR spectrum and thermometric titration proved the analytical purity of ammonium pentaborate.

EXAMPLE 8

Crude ammoniumtetraborate-ammoniumpentaborate mixture (50.0 g) was dissolved in 100 ml hot water and treated with 10% sulfuric acid until pH 1 was reached. From the cooled water solution, 44.0 g boric acid (77.5%) was isolated. The mother-liquor contained the expected ammonium sulphate as by-product.

EXAMPLE 9

Following the procedure of Example 8, but substituting sulphuric acid with phosphoric acid, sulphurous acid and hydrochloric acid, similar yields of boric acid was obtained along with a mother-liquor containing ammoniumphosphates, ammonium sulphite and ammoniumchloride, respectively.

From the above description of my invention, it will be readily apparent that it provides a highly economical process for obtaining valuable boron-containing products from all types of borate ores, which process possesses the attendant advantages that it produces no waste materials having a deleterious effect upon the environment and that useful by-products are produced.

Having disclosed my invention, I claim:

1. A process for producing purified ammonium pentaborate from a finely ground alkali metal or alkaline earth metal tetraborate ore, comprising contacting said ore with ammonium sulphite in the presence of methanol and sufficient water whereby the trimethylborate-ammonia adduct intermediate formed hydrolyzes into ammonium pentaborate, separating the resulting methanol solution of said ammonium pentaborate from the concurrently formed methanol-insoluble alkali metal or alkaline earth metal sulphites and gangue, and recovering said ammonium pentaborate from said solution.

2. A process as claimed in claim 1 in which said methanol is heated.

3. A process as claimed in claim 2 in which said methanol is heated by generating said ammonium sulfite in situ by introducing ammonia and sulphur dioxide into said methanol, the reaction being exothermic.

4. A process as claimed in claim 3 in which said ammonia and sulphur dioxide are introduced simultaneously into a slurry of said finely ground ore in said methanol.

5. A process as claimed in claim 1 in which the boron content of said ore is in the form of sodium tetraborate.

6. A process as claimed in claim 5 in which the borate of said ore has the formula $Na_2B_4O_7 \cdot 10H_2O$.

7. A process as claimed in claim 1, in which the amount of water present is in excess of that required to hydrolyze said adduct to said pentaborate, the methanol is distilled off and ammonium pentaborate is separated from the residual water.

8. A process as claimed in claim 7 in which said ammonium pentaborate is recrystallized from water to produce the substantially pure compound.

9. A process as claimed in claim 1 in which the amount of water present is in excess of that required to hydrolyze said adduct to said pentaborate, the aqueous ammonium pentaborate is treated with a mineral acid to produce boric acid and a salt of said acid, and boric acid is separated from said salt.

10. A process as claimed in claim 9 in which said acid is sulphurous acid and, after separation of said boric acid, the ammonium sulphite formed is dried and recycled to the process.

11. A process as claimed in claim 9 in which the acid is one other than sulphurous acid and the salt of said acid, after separation from boric acid, is absorbed in a porous material to produce a product useful as a fertilizer.

12. A process as claimed in claim 11 in which said acid is phosphoric, sulphuric or hydrochloric acid.

13. A process as claimed in claim 12 in which the acid is phosphoric acid.

14. A process for producing trimethyl borate-ammonia adduct from a finely ground anhydrous alkali metal or alkaline earth metal borate ore, comprising contacting said ore with ammonium sulphite in the presence of methanol and recovering said adduct from the reaction mixture.

15. A process as claimed in claim 14 in which said adduct is hydrolyzed to produce ammonium pentaborate.

* * * * *